(12) United States Patent
Dietrich

(10) Patent No.: US 7,045,739 B2
(45) Date of Patent: May 16, 2006

(54) STRIPPING FLAT CABLES

(75) Inventor: Jorn Dietrich, Siegendorf (AT)

(73) Assignee: I & T Flachleiter Produktions-Ges.m.b.H., Siegendorf (AT)

(*) Notice: Subject to any disclaimer, the term of this patent is extended or adjusted under 35 U.S.C. 154(b) by 217 days.

(21) Appl. No.: 10/654,514

(22) Filed: Sep. 3, 2003

(65) Prior Publication Data
US 2004/0134895 A1 Jul. 15, 2004

(30) Foreign Application Priority Data
Sep. 3, 2002 (EP) ............................. 02450196

(51) Int. Cl.
B23K 26/00 (2006.01)
B23K 26/14 (2006.01)
B23K 26/16 (2006.01)
B23K 26/18 (2006.01)

(52) U.S. Cl. ............................. 219/121.69; 219/121.68

(58) Field of Classification Search ............ 219/121.69, 219/121.68, 121.67, 121.85, 121.6
See application file for complete search history.

(56) References Cited

U.S. PATENT DOCUMENTS 4,931,616 A * 6/1990 Usui et al. ............. 219/121.68
6,509,547 B1 * 1/2003 Bernstein et al. ...... 219/121.68

* cited by examiner

Primary Examiner—M. Alexandra Elve
(74) Attorney, Agent, or Firm—Merchant & Gould

(57) ABSTRACT

The invention pertains to a process for stripping conductor traces (2) of extruded or laminated flat cables (1), so-called FFCs, using laser beams (4).

The invention is characterized in that a beam of a $CO_2$ laser or an Nd:YAG laser (4) is used in a first step, and an excimer laser or a frequency-multiplied Nd:YAG laser is used in a second step, in that the $CO_2$ laser or Nd:YAG laser is allowed to act on the extrudate (3) of FFC (1) with an intensity and duration such that an extrudate layer (6) a few microns thick still remains in the area of the conductor trace(s) (2), said layer being removed in the second step by the beam of the excimer laser or frequency-multiplied Nd:YAG laser.

2 Claims, 1 Drawing Sheet

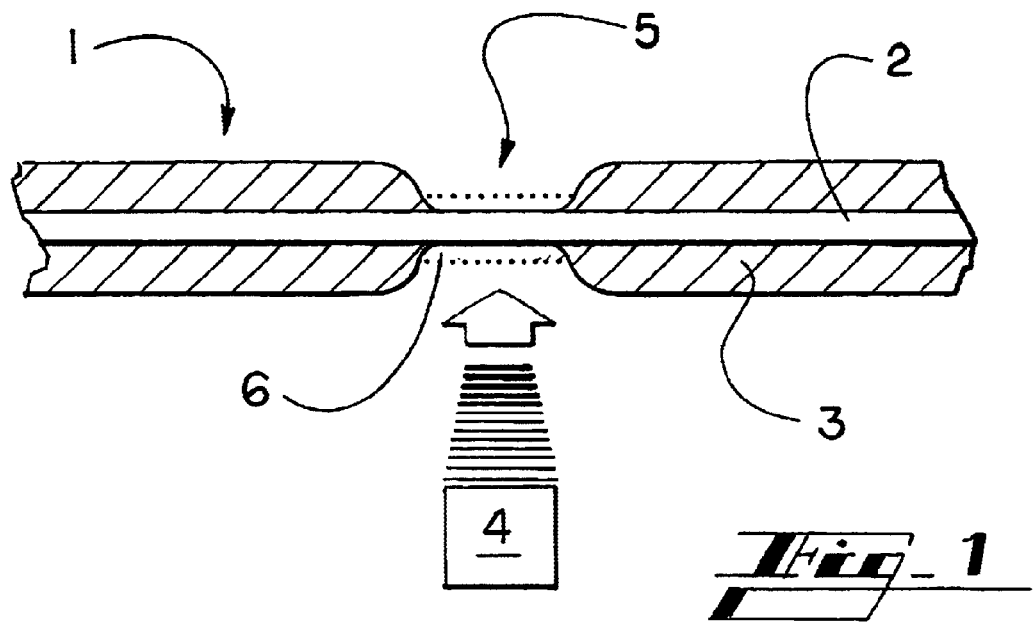
Fig_1
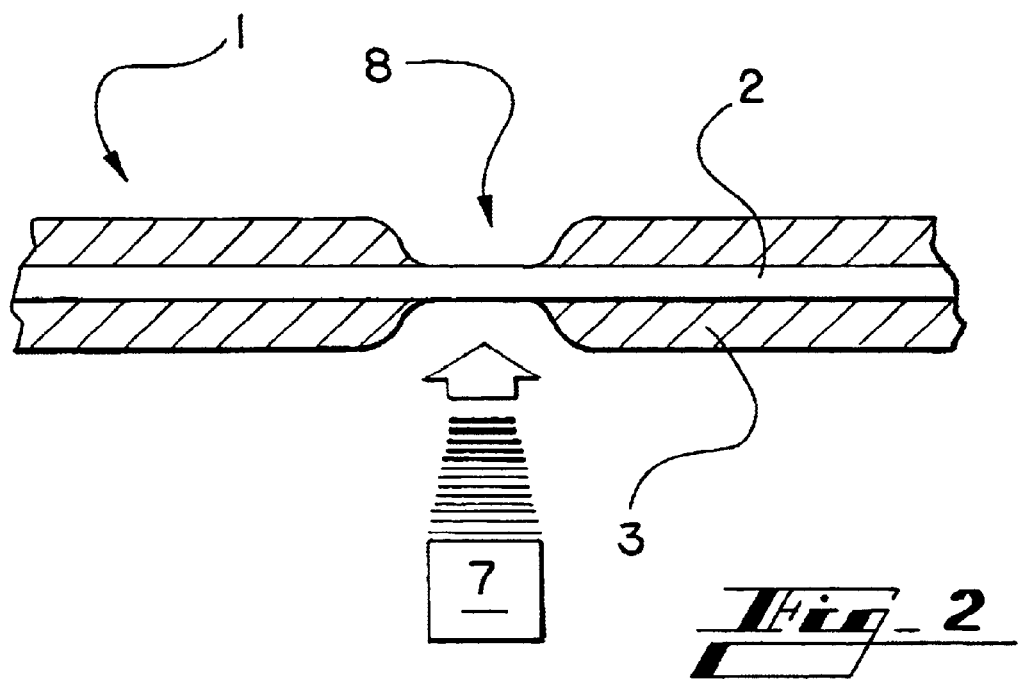
Fig_2

STRIPPING FLAT CABLES

The invention pertains to the stripping of flat cables. Flat [flexible] cables, so-called FFCs have been used increasingly in recent times because, in contrast to round cables, they can be manipulated by robots and are therefore more economical than round cables, particularly for the manufacturing of wire harnesses for motor vehicles, but also for other applications.

In principle, two types of FFCs must be distinguished, the laminated and the extruded ones. Laminated FFCs consist of electrical conductor traces, generally of copper, which are adhered in parallel between two films and are thus insulated against the outside and from one another. Under certain circumstances, the films can be of multiple construction or more than two films can be used.

Extruded FFCs consist of conductor traces that are fed through special extruding machines, wherein an electrically insulating extrudate is molded or injected around them, so that the individual conductor traces are insulated against the outside and from one another by the extrudate. The present invention pertains to both types of FFCs.

In both cases the actual conductor traces can be round, oval, rectangular or provided with another cross-sectional shape.

The use of FFCs, of whatever type, makes it possible to produce branches in that the insulation material is removed at the desired points in both FFCs, or as people say, windows are made, the FFCs are placed one on top of the other with windows aligned, the conductor-traces, now exposed and close to one another or superimposed with already contacting conductor traces, are soldered or welded together, and then insulation against the outside and between the conductor traces is reestablished, usually by adhesive masses, adhesive films or the like.

Additionally, it is also necessary to undertake insulation stripping at the ends of each FFC in order to be able to mount plugs, contacts or the like.

It has proven advantageous, even necessary, to expose the conductor traces on both sides even in the first case mentioned above, since only then can a mechanically stable and electrically reliable connection be formed between the superimposed conductor traces.

From everything that has been said, it is evident that there is a necessity to provide FFCs with windows, where the geometry of these windows should correspond as precisely as possible to the desired geometry, the removal of the insulating material should be as complete as possible, and where, in particular, the conductor traces after the formation of the windows should be in a condition, more specifically, a surface condition, that permits connection of superimposed conductor traces without elaborate preparations.

The methods previously used operated mechanically and consist of a combination of punching technology and a peeling process in the area already punched out down to the conductor traces. Because of unavoidable manufacturing tolerances, particularly for extruded FFCs, in which after all the conductor traces float in the solidifying extrudate without guidance and calibration of their own until the extrudate has solidified, this leads to problems with extrudate residues that adhere to the conductor traces and to damage to the conductor traces at points where the conductor trace is eccentric in the extrudate.

Attempts have already been made to remove the extrudate of the FFCs by means of lasers, but this brought about surface conditions of the conductor traces that necessitated elaborate post-treatment and thus were unsuitable for series sizes and cycle times that go beyond prototype operation.

Such a proposal is described in JP 04 7132 A. There a laser strikes the conductor trace which is thereby sufficiently heated so that the insulation peels off. However, the surface condition of the conductor traces is thereby compromised.

Another proposal is known from JP 04 017989 A and, in similar form, from U.S. Pat. No. 4,931,616 A. Here two laser beams resulting from splitting of a laser beam are each focused and brought into the desired form and then directed at an FFC arranged centrally between them with such energy that the insulation in the desired area is vaporized. How the apparatus withstands this if, for instance, the beam still exists when the insulation is already gone, what happens to the FFC if the laser pulse was not sufficient to vaporize the insulation and what the nature of the surface of the directly impacted conductor strips is like is not discussed, but is immediately obvious.

One must not forget here that a treatment of thus exposed conductor traces with liquid chemicals requires an intermediate station in the production process, in which these chemicals are applied under an exhaust hood and removed after they have exerted their action, that it is necessary to dry the corresponding points of the FFCs and to test them again for their mechanical and surface characteristics and that the chemicals used not only must be provided, but also reprocessed and ultimately disposed of. Additionally, it is fundamentally unpleasant to handle such chemicals among mechanical, electronic and laser-equipped processing stations in a production process.

The invention has the objective of specifying a process that does not have the aforementioned disadvantages, instead achieving the production of windows in FFCs in a reliable manner adapted to the entire production process, wherein it is possible to dispense with a post-treatment of the conductor trace surfaces, and the FFCs provided with the windows can either be immediately further processed or supplied to a station in which the exposed conductor trace surfaces are tin-plated to create a flawlessly conductive surface that can be reliably soldered or welded even after subsequent long-term storage, whereupon the thus produced FFCs can be stored in any desired manner.

According to the invention, these objectives are achieved in that the windows are produced by successive use of a $CO_2$ laser and an excimer laser. It is provided that the $CO_2$ laser acts on the FFC with an intensity and application duration such that an extrudate layer with a thickness of a few microns, between 2 and 5 µm, for instance, remains in the area of the conductor traces. By means of a few experiments, the settings necessary for this can easily be determined as a function of the extrudate and laser being used. The residual layer of extrudate is removed with the excimer laser; this substep surprisingly leaving behind a surface of the conductor traces (copper) that is optimally suited to direct welding, soldering or tin-plating.

In this manner, the disadvantages of the previously known processes are indeed avoided and the objectives of the invention are achieved. The invention will be described in greater detail below on the basis of a purely schematic drawing. Therein FIG. 1 shows the first and FIG. 2 the second process step.

FIG. 1 shows an extruded FFC 1 purely schematically in longitudinal section along a conductor trace 2, cross-hatching being dispensed with for the sake of clarity. FFC 1 consists in essence of several conductor traces 2, of which only one is visible because of the sectional view, and of an extrudate jacket 3. A $CO_2$ laser 4 that has already essentially formed a window 5 is shown in purely schematic form, the upper part of window 5 having already been formed symmetrically with respect to conductor trace 2 in a previous step. A region 6, which indicates the remaining extrudate layer 6 on conductor trace 2 in purely schematic and exaggerated form, is shown in dotted lines.

FIG. 2 shows the next step; an excimer laser 7 has already removed extrudate layer 6 and rough windows 5 has become finished window 8, in which conductor traces 2 are bare and ready for use. FIG. 2 also shows the situation that results when the second of the two sides of the FFC has been processed.

The invention is not limited to the illustrated embodiment, but can be modified in various ways. Thus it is possible to provide two lasers, one above and one below the FFC, and to use them alternately; $CO_2$ laser 4 and excimer laser 7 can be used alternately in the same station, so as not to have to move the FFC in the interim and thus achieve higher accuracies of the edges of the processing areas and so on.

It is also not absolutely necessary to use a $CO_2$ laser and an excimer laser; it is possible to use an Nd:YAG laser (wavelength range 1 μm to 11 μm.) and a frequency-multiplied Nd:YAG laser (wavelength range 150 nm to 1 μm) instead of the excimer laser. It is essential, however, that with the $CO_2$ laser or its equivalent a window be formed in which extrudate with a mean thickness between 2 and 5 μm remains and that this extrudate then be removed with the excimer laser or an equivalent.

What is claimed is:

1. Process for stripping conductor traces (2) of extruded or laminated flat cables, so-called FFCs (1), using laser beams, characterized in that a beam of a $CO_2$ laser or an Nd:YAG laser (4) is used in a first step, and an excimer laser or a frequency-multiplied Nd:YAG laser (7) is used in a second step, in that the $CO_2$ laser or Nd:YAG laser is allowed to act on the extrudate (3) of FFC (1) with an intensity and duration such that an extrudate layer (6) a few microns thick still remains in the area of the conductor trace(s), said layer being removed in the second step by the beam of the excimer laser or frequency-multiplied Nd:YAG laser (7).

2. Process according to claim 1, characterized in that the extrudate layer or laminate layer (6) remaining on the conductor traces (2) at the end of the first treatment step has a thickness between 2 and 5 μm.

* * * * *

UNITED STATES PATENT AND TRADEMARK OFFICE
CERTIFICATE OF CORRECTION

| | |
|---|---|
| PATENT NO. | : 7,045,739 B2 |
| APPLICATION NO. | : 10/654514 |
| DATED | : May 16, 2006 |
| INVENTOR(S) | : Jorn Dietrich |

It is certified that error appears in the above-identified patent and that said Letters Patent is hereby corrected as shown below:

Title page Col. 1;

The name of Assignee in INID Code 73 should read:

-- I & T Innovation Technology Entwicklungs-und Holding Aktiengesellschaft--.

Signed and Sealed this

Twenty-second Day of August, 2006

JON W. DUDAS
*Director of the United States Patent and Trademark Office*